MARGARET J. STUBBINGS.
Coffee-Pots.
No. 143,102.
Patented September 23, 1873.
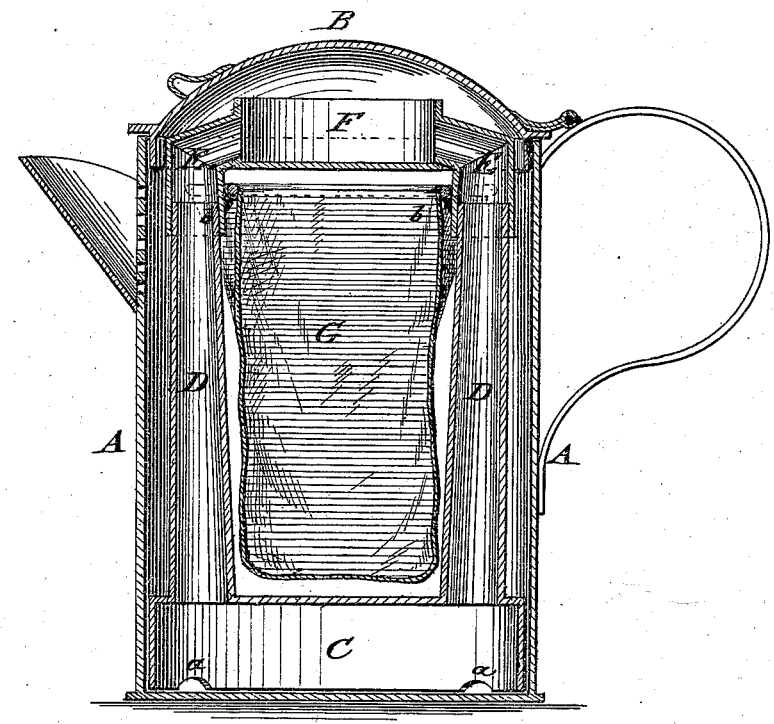
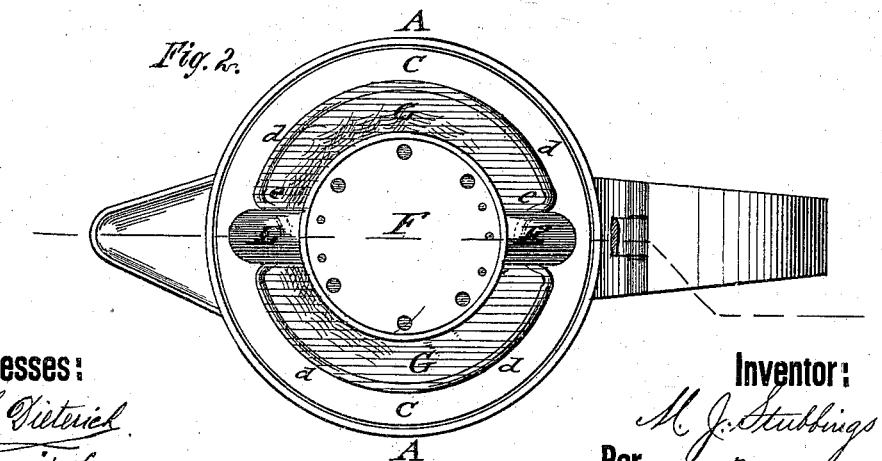

UNITED STATES PATENT OFFICE.

MARGARET J. STUBBINGS, OF YOUNGSTOWN, OHIO.

IMPROVEMENT IN COFFEE-POTS.

Specification forming part of Letters Patent No. 143,102, dated September 23, 1873; application filed May 5, 1873.

*To all whom it may concern:*

Be it known that I, MARGARET J. STUBBINGS, of Youngstown, in the county of Mahoning and State of Ohio, have invented a new and Improved Coffee-Pot, of which the following is a specification:

In the accompanying drawing, Figure 1 represents a vertical section of my improved coffee-pot on the line $c\,c$, Fig. 2; and Fig. 2 is a top view of the same with lifted cover to show inside of pot.

Similar letters of reference indicate corresponding parts.

The object of my invention is to furnish to housekeepers and others an improved coffee-pot which extracts fully the strength from the ground beans, produces superior coffee within short time, and prevents boiling over. My invention consists in a cylindrical steam-cover, connected, by pipes, with a perforated drum, and a muslin bag attached to it. The steam generated in the bottom part of the pot forces the boiling water continually over the coffee in the bag till the full strength of the same is extracted.

A in the drawing represents the outer part of the coffee-pot, of cylindrical or other shape, having a tightly-closing cover, B. A cylindrical cover, C, rests on the bottom of the pot, and is provided with recesses or notches $a$ at the lower open circumference. Two or more vertical pipes, D, of slightly-conical shape, are placed diametrically to each other on the top part of steam-cover C, and carry, by means of elbows E fitting closely over pipes D, the cylindrical drum F. The bottom of drum F is perforated, so that the boiling water which is forced up by the development of steam in bottom C passes, through pipes D and elbows E, into drum F, and, through the perforations, over the coffee suspended in bag G, of muslin or other suitable material. Lugs $b$ of elbows E project toward the inside of the pot, and serve to support ring $d$, to which the muslin bag G is attached, to be renewed from time to time. Ring $d$ is of larger diameter than drum F, and indented at $c$ to fit between the elbows E and rest firmly on lugs $b$.

To make coffee the boiling water is placed in the coffee-pot till it covers the steam-bottom C. The steam, generating in it, forces a continual flow of boiling water over the coffee in the bag G till all its strength is extracted. The drum and bag are then taken out, and the pot filled up with hot water till the desired strength is obtained. The coffee produced thereby is as clear as if eggs, isinglass, or other material had been used.

Having thus described my invention, I claim as new and desire to secure by Letters Patent—

1. In combination with the pot A, steam-chamber C, and circulating-tubes D, the detachable perforated spraying-drum F, provided with elbow-tubes E, and carrying a coffee receptacle or bag, G, as herein shown and described.

2. The bag G, provided with an upper rim or hoop, $d$, bent as shown, and supported by lugs $b\,b$ on the tubes E E, as set forth.

MARGARET J. STUBBINGS.

Witnesses:
GEORGE B. WOODMAN,
JOHN DAVIDSON.